United States Patent [19]

Malutich

[11] Patent Number: 5,036,654
[45] Date of Patent: Aug. 6, 1991

[54] REPLACEABLE CUTTING BLADE FOR ROTARY LAWN MOWER

[76] Inventor: William J. Malutich, R.R. 1, Toddville, Iowa 52341

[21] Appl. No.: 582,244

[22] Filed: Sep. 14, 1990

[51] Int. Cl.⁵ .................... A01D 34/73; A01D 55/18
[52] U.S. Cl. ........................................ 56/255; 56/295
[58] Field of Search ................. 56/255, 289, 295, 296, 56/300, 13.4

[56] References Cited

U.S. PATENT DOCUMENTS

| 4,594,843 | 6/1986 | Anderson et al. | 56/295 |
| 4,651,510 | 3/1987 | Malutich | 56/295 |
| 4,750,320 | 6/1988 | Liebl | 56/295 |
| 4,779,407 | 10/1988 | Pattee | 56/295 |

Primary Examiner—Thuy M. Bui
Attorney, Agent, or Firm—James C. Nemmers

[57] ABSTRACT

Removeable cutters are mounted at each end of a rotary lawn mower blade, which cutters can be removed and reinstalled with replacements easily and quickly without the use of tools. The replaceable cutters are each held in place by a positive locking arrangement, including a safety lock that is manually released by the user. During operation of the mower, the centrifugal force of the rotating blade further locks the cutters in place so that it is virtually impossible for them to become separated from the blade. The replaceable cutter unit also may include an air deflecting vane that aids in creating a suction action to pull the grass to an erect position and enhance the discharge of the grass clippings.

11 Claims, 1 Drawing Sheet

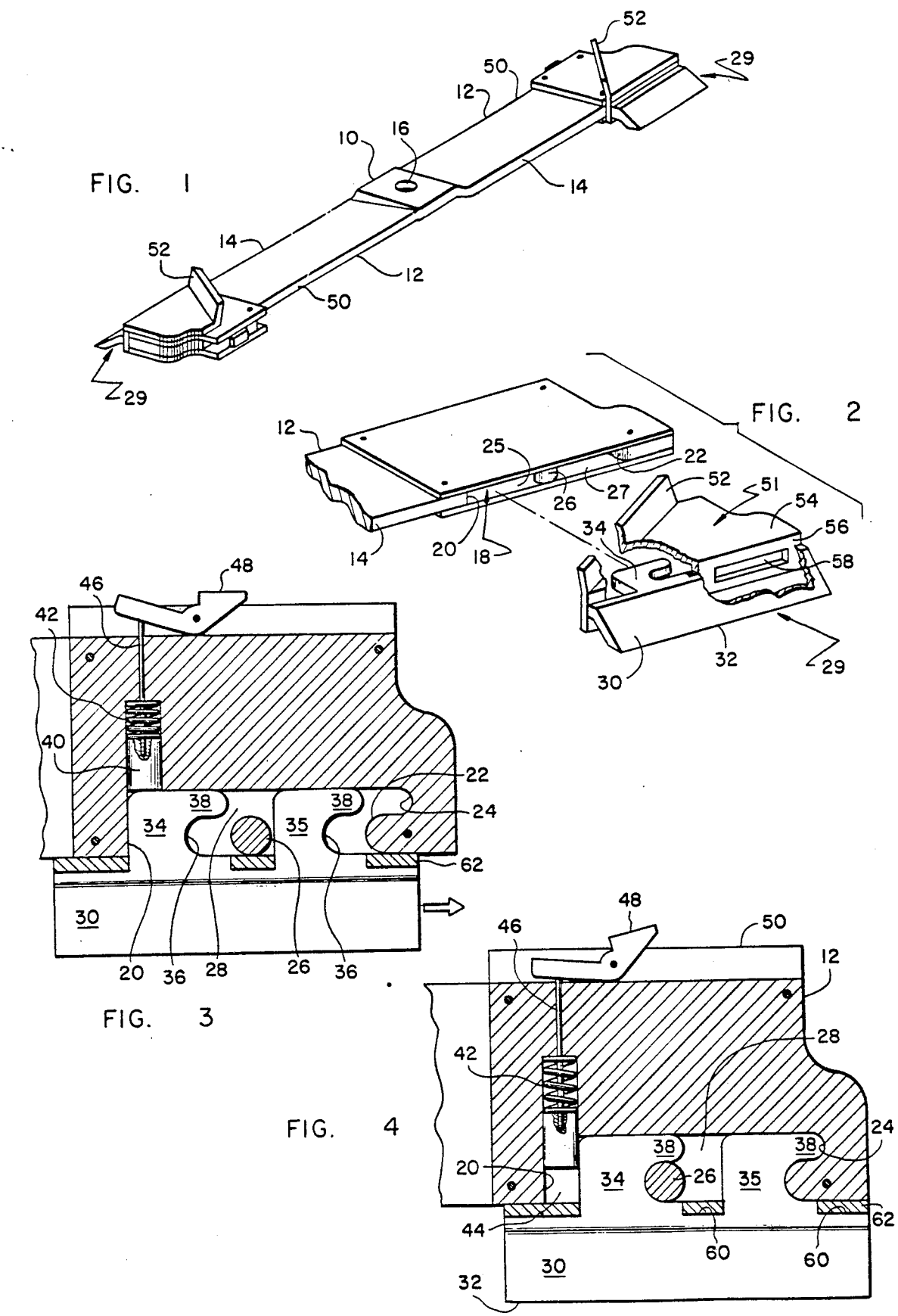

REPLACEABLE CUTTING BLADE FOR ROTARY LAWN MOWER

BACKGROUND OF THE INVENTION

Rotary lawn mowers are by far the most common type of mower used by homeowners. In addition, both single and gangs of rotary mowers are used in large scale commercial operations. The blades in these mowers are in almost all cases a flat, rectangular steel blade sharpened on the leading edge at each end of the blade to form a cutting edge. Depending upon how careful the user is and the amount of use of the mower, the blade should be sharpened several times a year. In order to properly sharpen the blade, the blade should be removed from the mower. This requires a considerable amount of time and the proper tools, and is not a task that the homeowner can easily perform himself. Most commonly, the user must transport the mower to a professional repair shop where the blade can be properly and professionally balanced and sharpened. This of course is costly, and after repeated sharpening, the blade must be replaced.

The prior art discloses various ways of solving the blade sharpening problem, including the use of removable cutters which can be sharpened and replaced, reversible cutters and disposable cutters. One design of replaceable cutters is shown in my U.S. Pat. No. 4,651,510, issued Mar. 24, 1987 for a "Blade for Rotary Mover". However, none of the prior art designs have achieved commercial success. The lack of commercial success is attributable to a variety of reasons, including the relative high cost of the cutters, and the difficulty of removing and installing them. Also, the lack of safety considerations has prevented some prior art designs from being commercially successful. There is therefore a need for improvements in the design of blades for rotary mowers that will resolve the problem of dull cutting edges that need to be frequently sharpened. There is especially a need for a rotary mower blade design that will allow the ordinary homeowner to keep a sharp blade on his or her rotary mower. Any such improvement which will facilitate having a sharp cutting blade must be completely safe and available at a cost that will offer the user a practical alternative to professional sharpening.

In addition to the problem of maintaining a sharp cutting edge on the blade for a rotary mower, there is a further need for blade designs that will more effectively pick up grass clippings and efficiently discharge them from the mower. Although my prior U.S. Pat. No. 4,651,510 also discloses improvements along this line, the air vanes also wear and need to be replaced, and there is a need for facilitating the replacement of these air vanes.

SUMMARY OF THE INVENTION

The blade of the invention is a basic flat blade with a removable and replaceable cutting cartridge at each outer end of the blade. The removable cutting cartridge has a cutting edge and a pair of locking lugs insertable in recesses formed in the leading edge of the blade, the locking lugs then being engageable around locking members as the cartridge is moved radially outwardly. A positive safety lock that is biased into a locking position then engages behind the locking lugs to hold them against the locking members, making it virtually impossible for the cartridge containing the cutting blade to be removed without manually releasing the safety lock. Also, because of the design, centrifugal force exerted on the cartridge during rotation of the blade will maintain the cartridge in its locked position.

Additionally, the cartridge may contain an air deflecting unit having an air deflecting vane, which unit is preferably separate from the cutting cartridge and can be also replaced as the vane wears. Since the unit is held in place by the cutting cartridge, it can be replaced at the same time the cartridge is replaced or the unit can be replaced as needed.

Other specific features of the invention will become apparent from the detailed description of the preferred embodiment, which includes the drawings identified hereinafter.

BRIEF DESCRIPTION OF THE DRAWING

FIG. 1 is a perspective view of a blade and showing the removable and replaceable cutting cartridges in place at each of the of the blade;

FIG. 2 is a perspective view of one end of the rotor showing the replaceable cartridge and air vane unit removed from the end of blade;

FIG. 3 is a plan view, partly in section, and showing the removable cartridge and air vane unit inserted in the end of the blade but not yet moved to the locked position; and FIG. 4 is a plan view, partly in section, similar to FIG. 3 and showing the removable cartridge and air vane unit locked in place with the safety lock engaged.

DESCRIPTION OF THE PREFERRED EMBODIMENT OF THE INVENTION

The rotary blade of the invention is shown assembled in FIG. 1, and the blade has a central portion 10 with an arm 12 extending outwardly in opposite directions from the central portion 10, each arm 12 being in a plane that is at an acute angle with the plane of the central portion 10. As best seen in FIG. 1, the planes of the arms 12 form opposite interior angles with the plane of the central portion 10 so that the leading edge 14 of each arm 12 is below the plane of the central portion 10. With the arms 12 each tilted downwardly toward the leading edges 14, rotation of the blade is like a fan blade producing vertical suction inside the mower housing to assist in pulling the grass to be cut to an erect position for clean cutting. This suction action also enhances the discharge of the clippings and other debris from the mower housing.

In order to mount the blade on the drive shaft of the mower with which the blade is used, the central portion 12 has a central opening 16 through which the drive shaft of the mower extends. As is well known, the drive shaft is commonly threaded at its outer end to receive a retaining nut. However, the specific mounting of the blade to the mower does not form a part of the invention.

The outer end of each arm 12 has formed in the leading edge 14 a recess indicated generally by the reference numeral 18. The recess 18 is defined in part by an inner shoulder 20 and an outer shoulder 22. The inner shoulder 20 is formed along a line substantially perpendicular to a radial line extending from the central opening 16 along the center of the arm 12. The outer shoulder 22 has formed in it a radially extending locking recess 24 as best seen in FIGS. 3 and 4. A vertically extending locking member 26 is located at the outer edge of the recess 18 so as to provide a space 28 behind member 26. Locking member 26 also divides the opening of recess 18 into two elongated slots, an inner slot 25 and an outer slot 27, the inner slot 25 being slightly wider than the outer slot 27 for a purpose that will be explained hereinafter.

The removable cutting blade cartridge 29 consists of a body 30 that has a cutting edge 32 and a pair of rearwardly extending locking lugs, an inner lug 34 and an outer lug 35. The inner lug 34 is slightly wider than the outer lug 35, the widths corresponding to the widths of the slots 25 and 27 in the blade. The locking lugs 34 and 35 each have a recessed portion 36 and an outwardly extending locking finger 38. As best seen in FIG. 3, the shape of the recessed portion 36 of each locking lug 34 and 35 is curved so as to conform to the shape of the locking member 26 and the outer shoulder 22 with the locking fingers 38 fitting into the locking recess 24 and the space 28 behind the locking member 26. Once the cartridge 29 is positioned with the locking lugs 34 and 35 inserted into the slots 25 and 27 as seen in FIG. 3, the cartridge 29 is then moved radially outwardly in the direction of the arrow of FIG. 3 until the locking fingers 38 are engaged in the locking recess 24 and the space 28 behind the locking member 26. In this locked position (shown in FIG. 4), the cartridge 29 cannot move in any direction except radially inwardly.

However, to prevent any movement of the cartridge 29 radially inwardly, there is provided a safety lock 40 that is biased toward the leading edge 14 of the blade by a spring 42. As best seen in FIG. 4, when the cartridge 29 is in its locked position, a space 44 is created between the locking lug 34 and the inner shoulder 20. The safety lock 40 fills this space and positively locks the cartridge 29 to the arm 12 making it impossible to remove the cartridge 29 unless the safety lock 40 is withdrawn from the space 44. To permit the safety lock to be withdrawn so that the cartridge 29 can be removed for replacement, the safety lock 40 is connected by an operating rod 46 or other suitable connecting member to a release lever 48 mounted on the trailing edge 50 of the arm 12. By depressing the release lever 48, the operating rod 46 will withdraw the safety lock 40 against the bias of the spring 42 and allow the cartridge 29 to be moved radially inwardly disengaging the locking fingers 38 from the locking recess 24 and the locking member 26, thus permitting the cartridge 29 to be easily withdrawn and replaced.

To insert a cartridge 29, it is only necessary to align the locking fingers 38 with the slots 25 and 27 in the opening of recess 18 and push the cartridge 29 inwardly into the recess 18 with the edge of the locking lug 34 engaging the safety lock 40 and forcing it against the resistance of the spring 42 out of the space 44. When the cartridge 29 is fully inserted in recess 18, it is moved radially outwardly until the locking fingers 38 are engaged in the locking recess 24 and the space 28 at which time the safety lock 40 will be forced into the space 44 by spring 42 locking the cartridge 29 in place.

As an additional feature of the invention, there is provided at the outer end of each arm 12 an air deflecting unit 51 containing an air deflecting vane 52. Such vanes 52 are known, one design of such vanes being shown in my earlier U.S. Pat. No. 4,651,510. However, vanes 52 are subject to erosion and wear and should be periodically replaced. Therefore, I have shown in the preferred embodiment a replaceable unit having a van which e unit is held and locked in place by the cartridge 29. The vane 52 of each unit is mounted on a support plate 54 so that the vane 52 is preferably at an angle of 45 degrees to the leading edge 14 of the blade. A mounting flange 56 is secured to or formed integrally with the support plate 54 at its leading edge. Mounting plate 56 has a pair of elongated slots 58 of a width corresponding to the width of the slots 25 and 27. This allows the vanes 52 and their supporting structure to be secured at the outer end of the arm 12 by inserting the locking lugs 34 and 35 through the slots 58 before the locking lugs 34 and 35 are inserted into slots 25 and 27 of the recess 18 at the outer edge of the arm 12. To accommodate the mounting plate 56 of the air deflecting vane 52, notches 60 are preferably formed on the inside edge of the body 30 of the cartridge 29. Thus, when the cartridge 29 is inserted and locked in place as previously described, the air deflecting unit 51 is clamped between the inner edge of the cutting portion 30 of the cartridge 29 and the leading edge 14 of the arm 12.

Moreover, to facilitate standardization of the manufacture of the cutting edge cartridge 29, whether it is used with or without the air deflecting vane unit 51, an adapter plate 62 can be provided, which adapter plate 62 is basically the mounting plate 56 formed separately from the air deflecting unit 51. Adapter plate 62 is used when the cartridge 29 is used without the air deflecting unit 51.

Thus, from the foregoing description, it will be evident that the invention provides a removable cartridge having a cutting edge that is positively locked in place and which is virtually impossible to remove unless the safety lock 40 is released. Because of the design, during rotation of the blade the centrifugal force created by such rotation will force the locking fingers 38 into the locking recess 24 and space 28 to assure that the cartridge 29 will not come loose during operation. Obviously, the cutting cartridge is quickly and easily replaced by the user without removal of the blade merely by depressing the release lever 48 which will allow the cartridge 29 to be remove radially inwardly and pulled from the blade.

Also, if it is desired to provide the blade with air deflecting vanes, the invention permits a removable and replaceable vane that is held and locked in place by the same locking means that holds and locks the cartridge 29 containing the cutting edge 32.

It will thus be evident from the foregoing description that the invention provides an improved blade for rotary mowers in that the cutting edges can be quickly, easily, and inexpensively removed and reinstalled. This will eliminate the expensive and relatively difficult sharpening of the blades now in use, permitting the user to replace the disposable cutting blade cartridges in a matter of seconds. Because the design of the replaceable cutting edge cartridges has a positive locking system with a safety lock that must be manually released, safety is assured. Also, it will be noted from the design of the cartridges 29, that a single cartridge will fit on either end of the blade, thus eliminating the need for two different cartridges. Also, from the design, it will be noted that it is impossible to improperly install the cartridge 29. If the user has the cartridge 29 inverted, it cannot even be inserted because the inner locking lug 34 is wider than the outer locking lug 35, and the width of the corresponding slots 25 and 27 in the recess 18 of the blade will not permit the improper or inverted installation of the cartridge 29.

Having thus described the invention in connection with a preferred embodiment thereof, it will be obvious to those skilled in the art that various revisions and modifications can be made to the preferred embodiment without departing from the spirit and scope of the invention. It is my intention, however, that all such revisions and modifications as are obvious to those skilled in the art will be included within the scope of the following claims.

What is claimed is as follows:

1. A blade for power rotary mowers and the like having an engine drive shaft to which the blade is attached, said blade comprising a central portion having a central opening adapted for attachment to the drive shaft, arms extending radially outwardly in opposite directions from the central portion, each arm having an upper surface and a lower surface with a leading edge and a trailing edge and terminating at an outer end, the outer end of each arm having an opening formed between the upper and lower surfaces of the arm with the entrance to the opening located along the leading edge of the arm, a locking member ex tending generally transversely to the upper and lower surfaces of the arm at the entrance to the opening to define a recess behind the locking member, cutting means removably attached to the leading edge of each arm at its outer end, the cutting means having a cutting edge and a locking lug extending away from the cutting edge, the locking lug being insertable through the entrance to the opening so as to be engageable behind the locking member when the cutting means is moved radially outwardly after insertion into the opening, and locking means moveable into the opening after the cutting means is moved into locking position thereby maintaining the cutting means in a locked position relative to the arm with the locking lug positively positioned behind the locking member.

2. The blade of claim 1 in which the locking member is located off the center of the entrance to the opening so as to divide the entrance into a first entrance and a second entrance to the opening, the first entrance being wider than the second entrance, a second locking member is formed at the side of the second entrance to the opening in each arm, the cutting means has a first locking lug and a second locking lug, the first locking lug being wider than the second locking lug, the width of the first locking lug corresponding to the width of the first entrance but being wider than the second entrance, and the width of the second locking lug corresponds to the width of the second entrance, whereby the cutting means is attachable to an arm only when the locking lugs and entrances to the opening are properly aligned.

3. The blade of claim 2 in which each locking lug includes a locking finger that is engageable behind the respective ones of the first and second locking members when the cutting means is moved into locking position.

4. The blade of claim 3 in which the locking means includes a safety lock moveable into the space in the opening created when the cutting means is moved into locking position, thereby maintaining the locking fingers engaged behind the locking members until the safety lock is moveable out of said space.

5. The blade of claim 4 in which means biases the safety lock into said space, and a manual release is operatively connected to the safety lock to provide for moving the safety lock out of said space.

6. The blade of claim 5 in which there is provided a removable air deflecting vane which is attachable to the arm so as to be positioned on the upper surface of the arm, said vane being held in place by attachment of the cutting means when the cutting means is properly attached to the arm.

7. The blade of claim 6 in which the vane is mounted on a vane mounting member having openings therein corresponding to the first and second entrances to the opening in the leading edge of the arm, the locking lugs being insertable through the openings in the mounting member and then into the entrances so as to hold the vane mounting member in place against the leading edge of the arm when the locking means in a locked position.

8. The blade of claim 3 in which there is provided a removable air deflecting vane which is attachable to the arm so as to be positioned on the upper surface of the arm, said vane being held in place by attachment of the cutting means when the cutting means is properly attached to the arm.

9. The blade of claim 3 in which there is provided a removable air deflecting vane which is attachable to the arm so as to be positioned on the upper surface of the arm, said vane being held in place by attachment of the cutting means when the cutting means is properly attached to the arm.

10. The blade of claim 2 in which there is provided a removable air deflecting vane which is attachable to the arm so as to be positioned on the upper surface of the arm, said vane being held in place by attachment of the cutting means when the cutting means is properly attached to the arm.

11. The blade of claim 1 in which there is provided a removable air deflecting vane which is attachable to the arm so as to be positioned on the upper surface of the arm, said vane being held in place by attachment of the cutting mean when the cutting means is properly attached to the arm.

* * * * *